United States Patent [19]

O'Connor

[11] Patent Number: 5,475,952
[45] Date of Patent: Dec. 19, 1995

[54] FLOOR COVERING FOR DECK PLANKS

[75] Inventor: Lawrence J. O'Connor, Winnipeg, Canada

[73] Assignee: O'Connor Enterprises Ltd., Winnipeg, Canada

[21] Appl. No.: 377,724

[22] Filed: Jan. 25, 1995

[51] Int. Cl.⁶ .................................... B32B 3/30
[52] U.S. Cl. .................. 52/177; 52/738.1; 428/99; 428/163; 428/167; 428/172; 428/174; 428/182
[58] Field of Search ............................ 428/99, 163, 167, 428/172, 182, 174; 52/177, 727

[56] References Cited

U.S. PATENT DOCUMENTS 4,907,387  3/1990  Turnbull ............................ 52/177

FOREIGN PATENT DOCUMENTS

WO/90/10112  9/1990  WIPO.

Primary Examiner—Alexander S. Thomas
Attorney, Agent, or Firm—Adrian D. Battison; Murray E. Thrift

[57] ABSTRACT

This invention relates to a floor covering arrangment in the form of a plurality of strips of floor covering material having a fibrous floor covering layer, the strips being arranged for mounting on the upper surfaces of deck planks.

11 Claims, 3 Drawing Sheets 5,475,952

FLOOR COVERING FOR DECK PLANKS

This invention relates to a floor covering arrangement in the form of a plurality of strips of floor covering material having a fibrous floor covering layer, the strips being arranged for mounting on the upper surfaces of deck planks.

BACKGROUND OF THE INVENTION

Decking is widely used for docks, patios and the like particularly in the home situation. The deck planks provide a simple construction and an effective supporting surface but generally are unsatisfactory in that the exposed wood is liable to deterioration due to the wetting and drying process and in that the surface exposed is unsatisfactory in that it can leave dangerous splinters and can be slippery when wet.

Many users therefore wish to cover the decking with a carpeting material or the like which is much more comfortable underfoot, which avoids the possibility of splinters and which can inhibit the deterioration of the wood due to weathering.

It is of course possible to lay simply a broad band of carpeting over the decking and over the gaps that are provided between the decking planks to allow the escape of water. This is generally unsatisfactory in that it then inhibits the escape of the water to reduce the drying effect and in addition the carpeting generates grooves or lines across the carpeting which is unattractive.

Attempts have been made therefore to generate strips of a floor covering material which can be simply applied to the decking planks with the strips having a width substantially equal to the decking planks so as to cover the upper surfaces of the decking planks and yet to leave the spaces between the decking planks for the escape of water.

One arrangement for covering deck planks is shown in U.S. Pat. No. 4,907,387 of Turnbull issued in 1990. Turnbull discloses what he calls a patio deck sheath. This comprises a channel member with a horizontal surface and two vertical depending sides which is placed over the decking plank to cover the upper surface and sides of the decking plank. The upper surface is molded with grooves which are stated to be generally 1/16 of an inch deep and are formed in a herringbone pattern to provide an anti-slip surface. It is stated that the grooves and ridges may be formed on the top surface after the channel member is extruded.

This is arrangement of Turnbull has not achieved any commercial success and it is believed that there are a number of major disadvantages which have led to the failure to obtain acceptance.

1. The covering of the sides of the plank requires as much material as is necessary to cover simply the upper surfaces of the plank and accordingly this additional material significantly increases the cost of the product.

2. The portions of the channel member covering the sides of the plank are generally of the order of 1/8" thick. Generally it is simply not possible to slide two 1/8" thick layers between decking planks as they are usually spaced 1/4" apart when installed. In addition decking planks are generally not straight so that there is warping after installation leading to a significant reduction in the spacing between the planks at localized points along the length of the planks. It is simply not possible, therefore, to apply the side coverings of the sheath into the area between the deck planks except in situations where the coverings are applied during the initial installation so that the deck planks can be spaced at greater distances.

3. As the planks, particularly on older decks, are often bent due to the warping effect, it is necessary for the channel member to also bend to follow the shape of the deck plank. This is simply not possible when using a channel shape which will prevent bending of the channel member about an axis at right angles to the upper surface.

4. The channel member would necessarily be supplied in predetermined lengths as it is not possible to roll the channel member. The predetermined lengths of course will not match the lengths of the deck planks and hence joins will be necessary leading to an unattractive appearance and the danger of lifting of the covering at the join.

5. The channel member is attached to the deck plank by a layer of adhesive applied onto the top of the deck plank to which the channel member is attached. It is very difficult to bond the rigid piece of plastic material as formed by the channel member using an adhesive to the deck plank particularly if the deck plank is warped providing a curvature and in addition since the deck plank often changes in dimension due to expansion and contraction caused by temperature changes.

The present inventor set forth some further proposals for a floor covering material for deck planks in his International Application WO90/1 0112 published Sep. 7, 1990. This document discloses a layer of a fibrous floor covering material which is attached to the upper surface of the deck plank and covers only the upper surface of the deck plank. The attachment is effected by staples applied in rows adjacent side edges of the covering material. The staples are attached to the under surface of the fibrous material by adhesive bonding strips through which the legs of the staples project for engagement into the upper surface of the wood of the deck plank.

The above arrangement achieved some commercial success but eventually was abandoned due to a number of technical problems. In particular it was necessary to attach the material to the deck plank at positions adjacent the edges of the plank to ensure effective attachment in view of the instability of the material. This attachment tended to form bubbles underneath the material in response to differential expansion, improper application or any kinking of the covering layer. These bubbles tend to flap when stepped upon which is simply unacceptable to the user. In addition, the complex construction and high level of material usage provided a product which was too expensive to meet market requirements.

The product obtained a high level of satisfaction from the customer with regard to the desirability of covering the decking planks but unfortunately received a low level of satisfaction in regard to the attachment technique and cost. Unfortunately it has not been possible to develop a product which will remain attached to the upper surface of the decking plank and will accommodate change in expansion characteristics and warping or warped deck planks. Until now the technical difficulties of maintaining such an attachment have prevented the manufacture of a product which satisfactorily fulfills the high level of requirement for the covered deck plank.

SUMMARY OF THE INVENTION

It is one object of the present invention to provide an improved floor covering for deck planks which overcomes many of the above stated disadvantages.

According to one aspect of the invention there is provided a floor covering comprising a plurality of elongate, nominally straight deck planks each having an upper surface with two side edges, two vertical side surfaces at the side edges of the upper surface and an under surface for attachment to a support frame, each deck plank being covered on its upper surface by a covering layer comprising an elongate generally planar, thin support strip, a layer of floor covering material attached to an upper surface of the support strip, the support strip having, in a relaxed condition thereof, an arch shape in cross-section such that a center part thereof is raised relative to two side edges thereof, the support strip and the floor covering material having a width substantially equal to a width of the plank so as to extend only to the side edges thereof leaving the side surfaces thereof exposed, and a plurality of transverse grooves in the support strip allowing slight bending of the support strip and the layer thereon about an axis at right angles to the support strip to follow those deck plank which are distorted from the nominal straight shape.

Preferably the fastening means comprises a plurality of mechanical fasteners arranged in a row along the center part, each mechanical fastener extending through the support strip and engaging mechanically into the material of the deck plank.

Preferably the support strip is flexible and has sufficient stiffness such that the arch shape tends to hold the side edges of the support strip downwardly onto the upper surface of the deck plank adjacent the side edges of the deck plank.

Preferably the grooves are formed by ribs on the upper surface only of the support strip which extend across the full width of the strip in a direction at right angles to the strip.

Preferably the support strip is formed from an extruded strip of suitable plastics material which is heat bonded prior to cooling to the fibrous floor covering material by passage between two chilled rollers which are shaped to form the arch shape and the ribs.

The fibrous covering layer ensures an attractive underfoot feel and the necessary anti-slip properties and is hence preferably, but not necessarily, of a fibrous material.

The support layer is preferably of polypropylene as this is cheap and provides the necessary physical properties but other material can be used if required.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
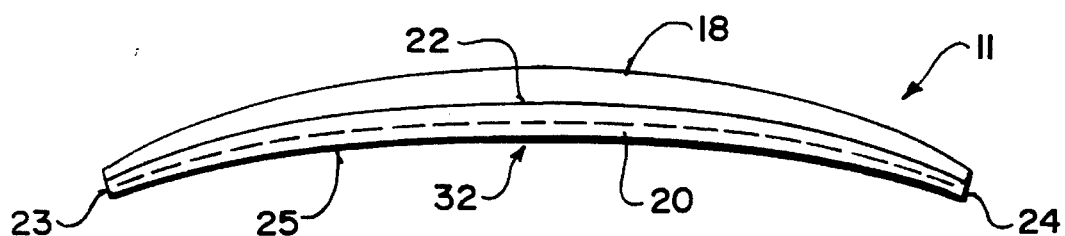
FIG. 1 is a transverse cross-sectional view through a layer of covering material for attachment to a deck plank.
Figure 2:
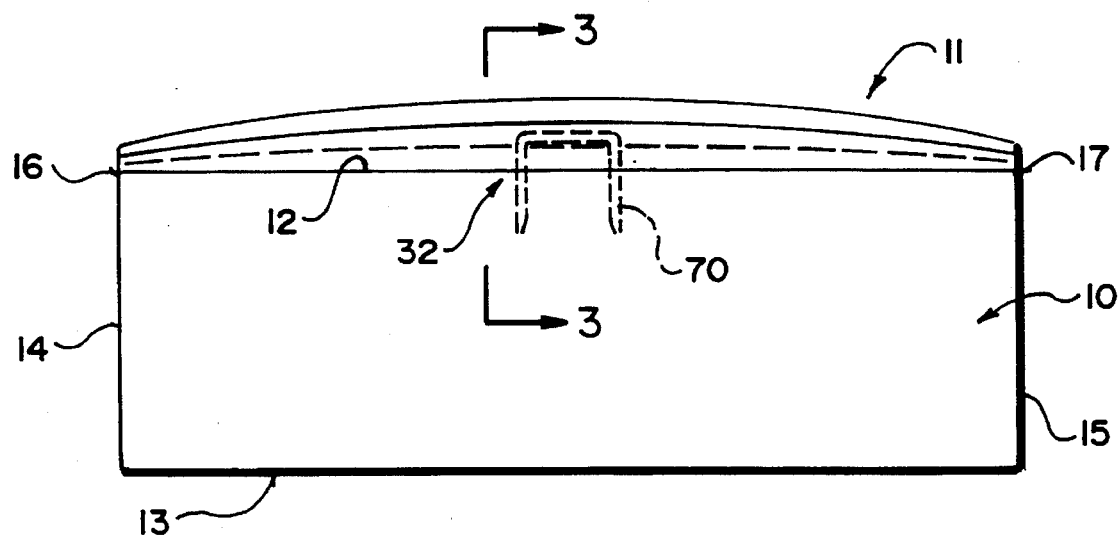
FIG. 2 is a similar cross-sectional view to that of FIG. 1 showing the covering layer of FIG. 1 attached to the deck plank.
Figure 3:
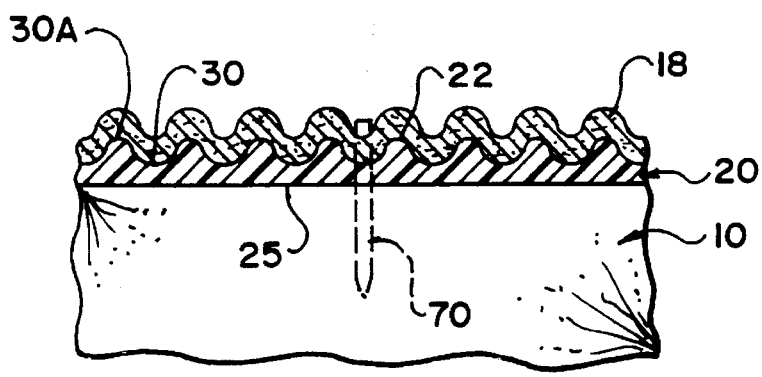
FIG. 3 is a cross-sectional view along the lines 3—3 of FIG. 2.
Figure 5:
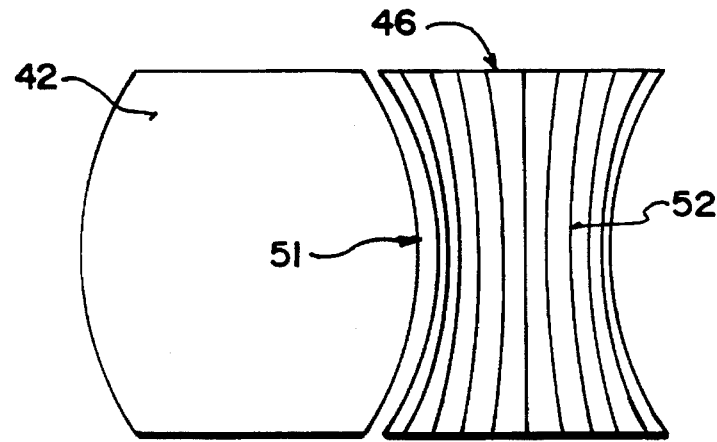
FIG. 5 is a top plan view of the chill rollers only of FIG. 4.
Figure 6:
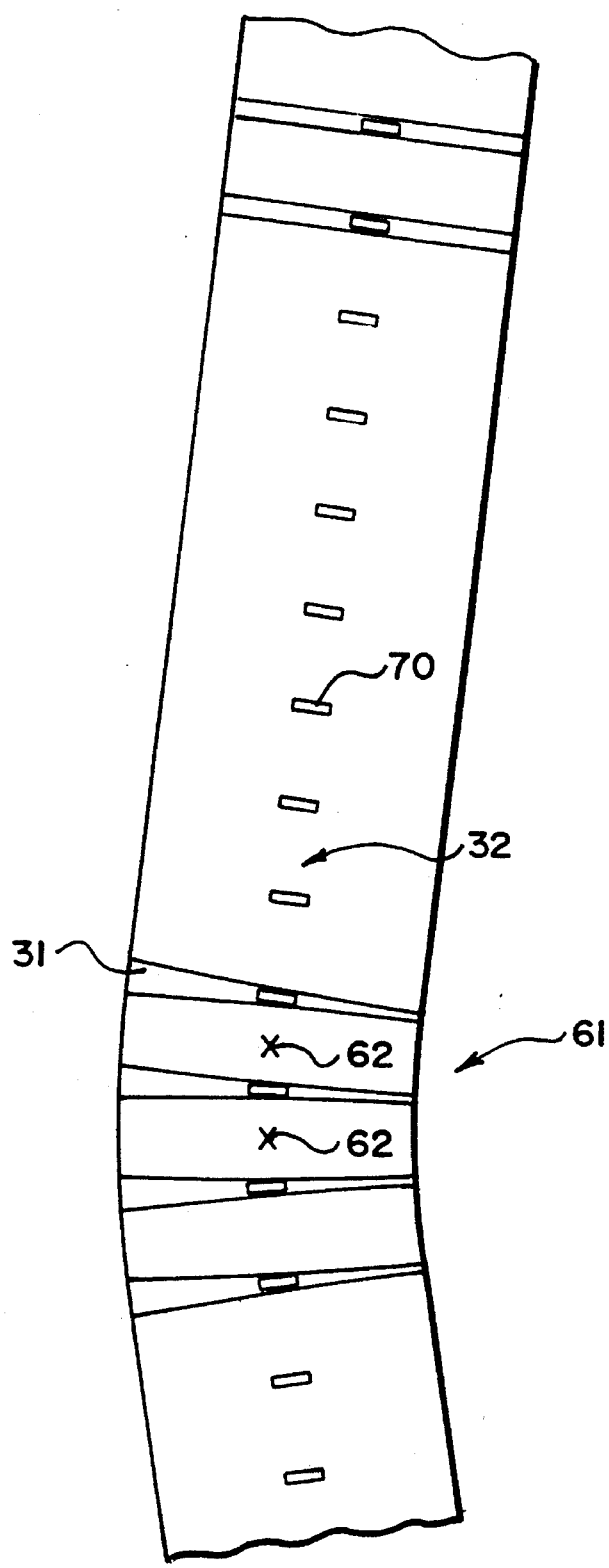
FIG. 6 is a top-plan view of a deck plank with the covering layer attached and showing the effect of the grooves, the warping of the deck plank being exaggerated for convenience of illustration.

The floor covering as shown in FIGS. 1, 2 and 3 comprises a deck plank 10 on which is attached a covering layer 11. The deck plank has an upper surface 12, a lower surface 13, two side surfaces 14 and 15 and two corners 16 and 17. The deck plank is nominally rectangular in cross-section and nominally straight in its elongate direction as shown in FIG. 5. However as discussed above, many deck planks are warped either prior to installation or become warped after installation due to the effects of weathering.

The layer 11 comprises a covering material 18 of a non-woven fibrous material commonly used in floor covering applications. The fibrous layer is generally formed in a felting-type process which forms a layer of sufficient thickness to provide an attractive underfoot feel and anti-slip properties. The fibrous layer is formed substantially in minimum thickness to achieve an acceptable underfoot layer and this can lie in the range 1 OZ/SQYD up to 20 OZ/SQYD. This provides a layer having a thickness of the order of 0.005 to 0.060 inch. The fibrous layer may be stitch bonded or may be maintained integral by a bonding agent or may simply be a layer of fibers which are basically attached and supported by attachment to a support layer 20. The fibrous layer is attached to the support layer 20 either by an adhesive or more preferably by heat bonding so that the underside of the fibers of the fibrous layer are bonded to an upper surface 22 of the support layer 20.

The support layer 20 and the fibrous layer 18 are coterminous so as to have overlying side edges 23 and 24. The side edges are spaced to define a width of the strip which arranged and manufactured to be equal to the nominal width of the deck plank so that the under surface 25 of the support layer lies on the upper surface 12 of the deck plank. The side edges 23 and 24 are substantially contiguous with the side surfaces 14 and 15 of the deck plank but of course deck planks vary slightly and accordingly the width is selected to be slightly less than the nominal width and equal to the expected minimum width to avoid any overlap at particular locations along the length of the deck plank. However the intention is that the covering layer cover the whole of the upper surface 12 and only the upper surface 12. The covering layer thus terminates at the edges 23 and 24 and includes no parts thereof extending downwardly or covering over the side surfaces 14 and 15.

The support layer 20 is formed with a plurality of grooves or recesses 30 and ribs 30A, depending upon the point of view, which extend transversely across the width of the support strip that is at right angles to the longitudinal direction of the deck plank. Thus as shown in FIG. 3 the upper surface 22 has recesses 30 and these recesses only on the upper surface of the support layer so that the under surface 25 of the support layer is flat. Each recess 30 is continuous through a center section 32 to the side edges 23 and 24. The grooves are arranged at spaced positions longitudinally of the support layer.

The support layer 20 is formed so that the lower surface 25 is arched so that the centre section 32 is raised slightly from the side edges 23 and 24 in the relaxed condition of the strip as shown in FIG. 1. In addition the layer 20 is formed so that it is thicker at the centre section 32 than at the side edges 23 and 24. In the arrangement shown the thickness gradually tapers from the centre section outwardly to the side edges but in an alternative arrangement the thickness may be substantially constant across the majority of the width and may taper adjacent the side edges 23 and 24 with an inclined or wedge shaped portion adjacent the side edges 23 and 24.

The fibrous layer or floor covering material 18 is also shown as being thicker at the centre section and thinner at the side edges. This is the preferred arrangement so that the thickness of the strip is at a minimum at the side edges to avoid catching of the side edges and lifting of the side edges since the side edges are thin and thus are raised from the upper surface 12 of the plank by only a short height. In an alternative arrangement, again the fibrous layer is generally of constant thickness across the majority of the width and tapers more rapidly downwardly at the side edges. In a yet further alternative arrangement the fibrous layer is of constant thickness across the width of the strip.

The amount of the arch is relatively small for example of the order of 0.25 inch across a strip of the order of 6 inches and this is provided so as to provide a tendency or biasing force on the side edges pulling them downwardly. The support layer is of course flexible and thus can flex when the side edges are lifted but there is a tendency in view of the arch to pull the side edges down onto the upper surface 12 of the deck plank.

The support layer 20 is formed so that the thickness at the recesses 30 is at a minimum to provide structural strength for the support layer and longitudinal direction and is in the preferred embodiment constant across the width of the support strip, The ribs 30A thus provide the increase in thickness at the centre, Also it will be noted that the fibrous layer is formed with the ribs so that the fibrous layer is of a constant thickness and is deformed into the recesses and over the ribs as is best shown in FIG. 3.

Figure 4:
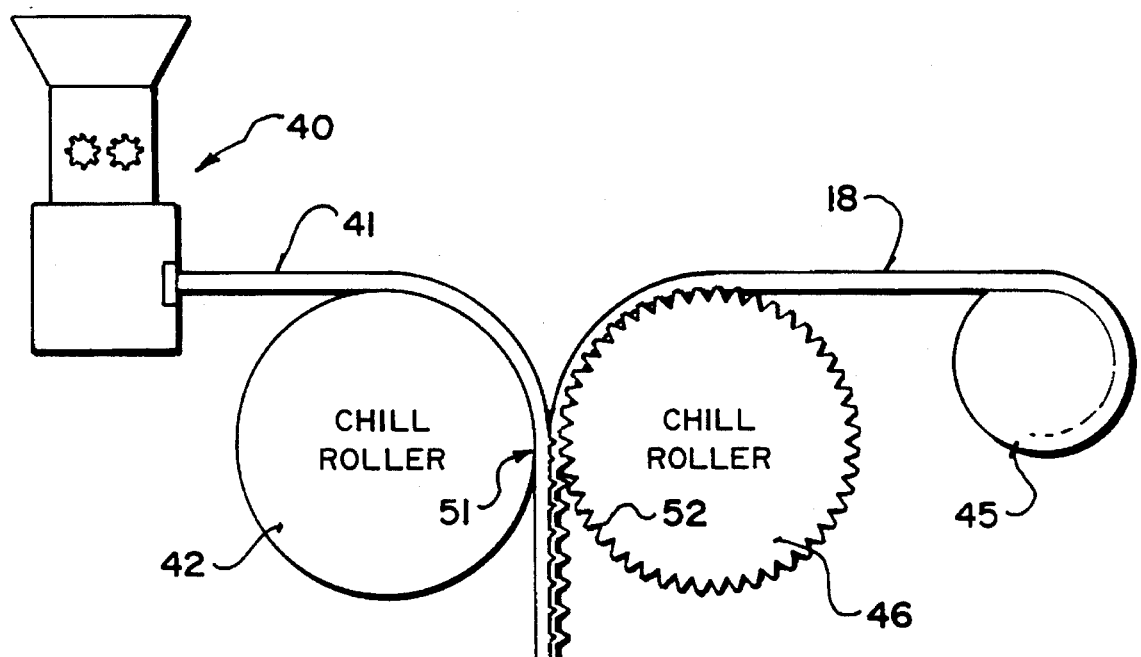
FIG. 4 is a schematic side elevational view of a process for manufacture of the floor covering material of FIGS. 1, 2 and 3.

The technique for manufacture of the floor covering material is shown in FIGS. 4 and 5, An extruder 40 is arranged to extrude a strip 41 of plastics material having a width equal to the required width of the support layer. The extruded strip 41 is passed over a chilling and forming roller 42 which has an outer surface which is smooth but is formed in a barrel or arched shape as shown in FIG. 5.

A roll 45 of the layer 18 is supplied adjacent to the extruder and passes the covering layer 18 over a guide roller 46 where it is laminated with the strip 41, The layer 18 is previously cut to the required width so that the lamination provides the side edges 23 and 24 of the structure. The rollers 42 and 46 cooperate in a nipping action at a nip line 51 which acts to squeeze the layer 18 onto the strip 41, The roller 46 is formed with recesses so that the squeezing action compresses the layer 18 and the strip 41 to squeeze the material into the recesses and thus form the ribs 30A. Thus the ribs are formed in both the fibrous layer and in the strip. The smooth outer surface of the roller 42 maintains the lower surface of the strip free from the ribs and recesses but arched due to the shaping of the rollers 42 and 46 as best shown in FIG. 5. Thus the nip line 51 is itself arched. The rollers 42 and 46 are chilled so as to provide a chilling action on the extruded polypropylene layer. The heat in the layer provides a bonding effect or heat sealing effect of the fibrous material on the upper surface of the layer and this bonding is maintained after the cooling occurs at the rollers and in the cool zone 47. The cooling sets the support layer in the shape as defined by the engagement with the nip rollers to maintain the structure of the ribs and the arch.

The polypropylene layer may be extruded in a coextrusion with an upper layer carrying a UV inhibitor. Thus the polypropylene layer is rendered resistant to ultra violet light should any such light penetrate through the fibrous layer.

The floor covering material is preferably of a fibrous material but can be formed of other materials which are of a character suitable for the upper surface of a floor covering material. Thus the material renders the surface pleasant to touch and resistant to slip. Other types of resilient material can therefore be used.

Downstream of the lamination the completed floor covering layer is passed through a coiling and setting zone 47 and over guide rollers 48 to a wind-up section 49 forming a reel 50 of the floor covering product.

Thus the layer 20 formed from the strip 41 is formed with the grooves in the upper surface thereof defined in the ribs 31 on the under surface.

In the plan-view of the deck plank with the covering layer thereon as shown in FIG. 5, it will be noted that the deck plank is warped as indicated generally at the area 61. The floor covering layer is then applied over the deck plank and is shaped to follow the warped effect of the deck plank. This is achieved by distorting the covering layer by bending about axes 62 which are at right angles to the deck plank and generally along the center line of the covering layer. This bending is obtained by flexing of the support layer at the grooves 30 so that the grooves on the outside of the warped section are opened as indicated at 31.

The ribs 30A assist in shaping the support layer to form an arch section as shown in FIG. 1 and to maintain the support layer in that generally arch shape when in a relaxed condition. The ribs thus provide structural strength and prevent or inhibit side edges of the strip from being lifted due to the structural strength of the ribs. The ribs are not present on the under surface and thus do not interfere with the support layer lying properly on the deck plank.

The covering layer is attached to the deck plank by a single row of staples 70 applied through the covering layer along the center portion 32 so that the side edges of the covering layer are free from fastening to the deck plank. The single row of fastenings thus allow differential expansion between the surface of the deck plank and the covering layer since there is no part of the covering layer in the transverse direction which is fastened at two places to the deck plank. The staples are arranged across the strip and lie in the grooves 30 so that they are recessed from the uppermost surface of the material as defined by the top of the ribs at the surface of the layer 18.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Floor covering comprising a plurality of elongate, nominally straight deck planks each having an upper surface with two side edges, two vertical side surfaces at the side edges of the upper surface and an under surface for attachment to a support frame, each deck plank being covered on its upper surface by a covering layer comprising an elongate generally planar, thin support strip, a layer of floor covering material attached to an upper surface of the support strip, the support strip having, in a relaxed condition thereof, an arch shape in cross-section such that a center part thereof is raised relative to two side edges thereof, the support strip and the floor covering material having a width substantially equal to a width of the plank so as to extend only to the side edges thereof leaving the side surfaces thereof exposed, and a plurality of transverse grooves in the support strip allowing slight bending of the support strip and the layer thereon about an axis at right angles to the support strip to follow those deck plank which are distorted from the nominal straight shape.

2. The floor covering according to claim 1 including fastening means engaging the center part only to fasten an under surface of the center part down onto the upper surface of the deck plank leaving the side edges of the support strip free from fastening to the deck plank.

3. The floor covering according to claim 1 wherein the floor covering material is fibrous.

4. The floor covering according to claim 1 wherein the grooves are continuous across the full width of the support strip.

5. The floor covering according to claim 1 wherein the fastening means comprises a plurality of mechanical fasteners arranged in a row along the center part, each mechanical fastener extending through the support strip and engaging mechanically into the material of the deck plank.

6. The floor covering according to claim 1 wherein the support strip is flexible and has sufficient stiffness such that the arch shape tends to hold the side edges of the support strip downwardly onto the upper surface of the deck plank adjacent the side edges of the deck plank.

7. The floor covering according to claim 1 wherein the grooves are formed between ribs raised on an upper surface of the support strip.

8. The floor covering according to claim 7 wherein the ribs are formed also in the floor covering material.

9. The floor covering according to claim 1 wherein the floor covering material is heat bonded to the support strip by engagement therewith after extrusion and before cooling.

10. The floor covering according to claim 9 wherein the floor covering material is heat bonded to the support strip by passing between a pair of cooled nip rollers which are shaped to form ribs defining the grooves therebetween in the upper surface of the support strip and the floor covering material.

11. The floor covering according to claim 1 wherein the support strip is tapered in a transverse direction so as to be thinner at the edges thereof.

\* \* \* \* \*